United States Patent [19]

Krohn

[11] 4,323,741
[45] Apr. 6, 1982

[54] MECHANICAL DEFLECTION APPARATUS FOR SENSING FLUID PRESSURE

[75] Inventor: Duane D. Krohn, Westminister, Colo.

[73] Assignee: Graco, Inc., Minneapolis, Minn.

[21] Appl. No.: 153,443

[22] Filed: May 27, 1980

[51] Int. Cl.³ .............................................. H01H 35/40
[52] U.S. Cl. ............................... 200/81.9 R; 200/81.8; 92/91; 73/736
[58] Field of Search .................. 200/83 D, 83 S, 81.8, 200/81 R, 81.9 R, 81.5; 92/91; 73/736, 741; 337/114, 119, 322

[56] References Cited

U.S. PATENT DOCUMENTS

| | | | |
|---|---|---|---|
| 1,814,092 | 7/1931 | Motherwell | 73/736 |
| 2,997,873 | 8/1961 | Dexter, Jr. | 73/736 |
| 3,188,419 | 6/1965 | Barksdale | 200/81.8 |
| 3,424,883 | 1/1969 | Heskett | 200/81.9 R |
| 4,085,305 | 4/1978 | Dietz | 200/81.9 R |

FOREIGN PATENT DOCUMENTS 694892 12/1930 France .............................. 200/81 R Primary Examiner—Gerald P. Tolin
Attorney, Agent, or Firm—Paul L. Sjoquist

[57] ABSTRACT

Apparatus is disclosed for sensing fluid pressure by mechanical flexure of a tube according to the principles of the Bourdon tube, wherein the tube forms a part of the fluid flow path, and where the pressure may be sensed during both dynamic and static fluid flow conditions.

9 Claims, 3 Drawing Figures

MECHANICAL DEFLECTION APPARATUS FOR SENSING FLUID PRESSURE

BACKGROUND OF THE INVENTION

The present invention relates to an apparatus for sensing fluid pressure, under dynamic and static fluid flow conditions, wherein the magnitude of the sensed pressure is represented by mechanical displacement of the measuring apparatus.

The principle of operation of Bourdon tube devices is well-known; such devices are typically closed end curved tubes which react to changes of the pressure of the material, either gas or liquid, contained within the tube by increasing or decreasing the tube curvature as a function of these pressures. Since the internal surface area of a curved, preferably flattened, tube is greater on the outer wall curvature than the inner wall curvature, increases in internal pressure cause a greater differential force on the outer wall curvature, thereby tending to straighten the curved tube. These principles have been utilized for many years to provide indicating and sensing devices wherein pressure changes can be related to the phenomena desired to be measured. For example, Bourdon tube devices have been used to measure temperature by enclosing a liquid in a closed circuit including a temperature sensing bulb and a Bourdon tube, wherein increasing liquid temperature develops increasing pressure which in turn causes physical deflection of the Bourdon tube, such as is described in U.S. Pat. No. 2,892,063, issued June 23, 1959.

In a typical operating environment a Bourdon tube device is connected with its opened end coupled to a source of liquid or gas, and its closed end is permitted freedom of movement, for the deflection of the closed end in response to pressure changes is used as the pressure indicating mechanism. Since the deflection of the closed end is gradual and more or less linearly related to pressure changes within the tube, and since the deflection is usually observable over only fairly small ranges of distance, it is frequently desirable to amplify this movement by means of levers attached to the closed free end of the tube. If it is desired to develop an instantaneous indication at a certain pressure or tube deflection position, various forms of electrical and mechanical toggle mechanisms may be utilized in connection with the closed free end of the tube. For example, U.S. Pat. No. 3,188,419 discloses a Bourdon tube pressure switch assembly wherein the closed end of the tube is place adjacent a microswitch actuator such that the inherent snap actuating mechanism of the microswitch becomes activated at a particular deflection angle of the tube end. As another example U.S. Pat. No. 1,838,377, issued Dec. 29, 1931 discloses a combination circuit controller and indicating mechanism wherein a mercury bulb having switch contacts is connected to the Bourdon tube and deflection of the tube causes the mercury bulb to become unbalanced and thereby causes the mercury fluid within the tube to flow to one end or the other completing an electrical circuit.

Many other applications of Bourdon tube devices are known in the art for measuring pressure and pressure-related phenomena and for indicating same and for providing signal generating means at predetermined measured levels. In all of these applications it is conventional to utilize a tube having a closed end which is relatively freely movable so as to generate the necessary pressure response motion. This construction is a disadvantage when it is desirable to measure liquids having contaminants therein, or which are subject to curing or drying inside the tube, thereby changing the physical operating characteristics of the device and effectiveness. As a result, Bourdon tube devices have not been utilized widely for measuring pressure and related phenomena for liquids such as paint, lacquer, thermo-setting materials, and any other liquid having a tendency to cure or harden or become deposited in solid form under static flow conditions.

In applications requiring the transfer of paint or other similar materials under high pressures it is desirable to provide a pressure sensing and control mechanism which cannot become adversely affected by the material. Leakage and curing of the material frequently damage such mechanisms unless they are properly designed and maintained. U.S. Pat. No. 3,614,352, issued Oct. 19, 1971 and owned by the assignee of the present invention, discloses a pressure response and control assembly suitable for such applications. This patent describes a movable plunger which is in direct contact with a pressurized paint supply, and which passes through a sealed housing to actuate an electrical switch. The switch controls an electric motor which is mechanically coupled to a reciprocating pump for developing paint pressure, and the mechanism may be adjusted to activate and deactivate the pump to develop paint pressures over a specified range. The range of pressures which are typically controlled by devices of this type are 0–3000 pounds per square inch (p.s.i.).

A disadvantage suffered by the foregoing device and other similar devices is in that a movable element of the device is usually in direct contact with the fluid whose pressure is being monitored. Contaminants, curing and leakage problems, and occasionally other factors may degrade or damage the pressure sensing mechanism to cause unreliable or faulty operation. It is therefore desirable to provide a pressure sensing and control device which does not have movable slides, plungers or other similar elements in direct contact with the material being measured.

SUMMARY OF THE INVENTION

The present invention provides a pressure sensing apparatus utilizing the principles of Bourdon tube devices without the necessity of a closed end tube for pressure sensing. The invention includes a pair of curved tubes having a flow communication manifold between their respective free ends for providing full flow of fluid through both tubes. The invention also contemplates the positioning of a signal generating device such as a switch proximate the flow coupling manifold for responding to physical movement of the manifold to generate a signal under predetermined pressure conditions.

It is therefore a principal object of the present invention to utilize the principles of a Bourdon tube for pressure sensing while permitting full fluid flow through the sensing mechanism.

It is another object of the invention to provide a signal generating device for indicating predetermined pressure levels.

It is another object of the present invention to provide means for adjusting the signal generating switch to different pressure thresholds.

BRIEF DESCRIPTION OF THE DRAWINGS

The foregoing and other objects of the invention will become apparent from the following specification, and with reference to the drawings, in which.

DESCRIPTION OF THE PREFERRED EMBODIMENT

Figure 1:
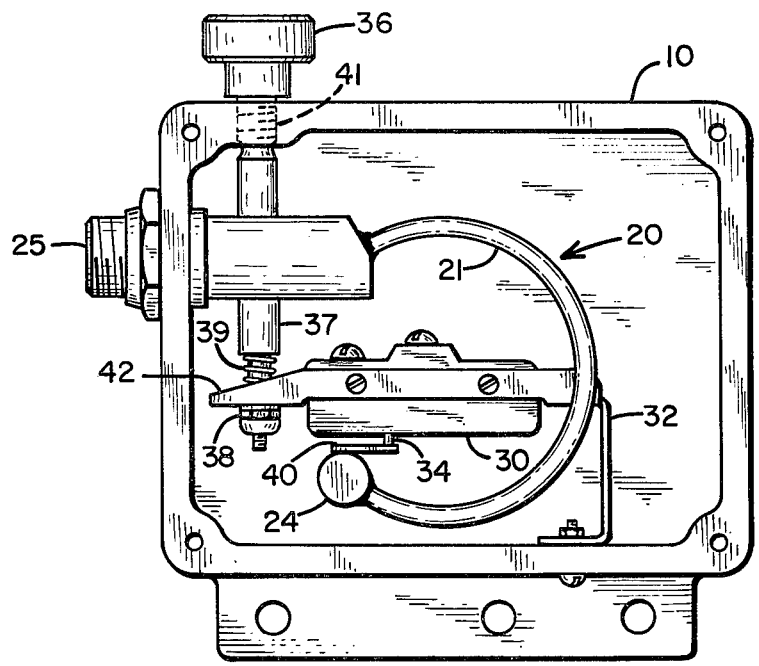
FIG. 1 is an elevation view of a preferred embodiment of the invention.
Figure 2:
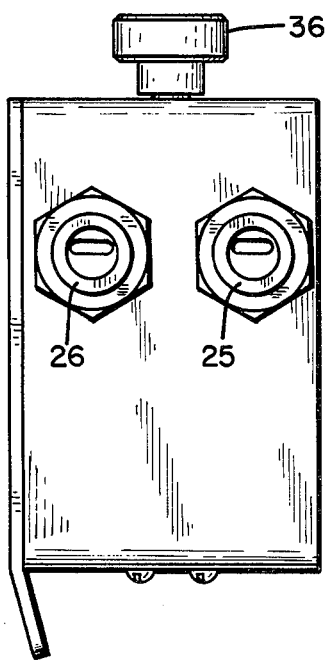
FIG. 2 is a side view of the invention.

Referring first to FIG. 1 and FIG. 2, there is shown a housing 10 preferably constructed from cast aluminum or similar material, which housing encloses the invention and has a cover (not shown) which may be fitted against the housing to form a sealed enclosure. In a proper application housing 10 and its cover may be designed to be an explosion-proof container, thereby isolating the electrical components therein from the external atmosphere surrounding the housing. Housing 10 encloses the pressure sensor 20, which includes a curved hollow tube 21 and a second curved hollow tube 22, and a bridging manifold 24. An inlet connection 25 is coupled into curved tube 21 and passes through the wall of housing 10. Similarly, an outlet connection 26 is coupled to curved tube 22 and passes through the wall of housing 10. Inlet and outlet connections 25 and 26 are threaded for connection to fluid flow pipes as will be hereinafter described. The ends of tubes 21 and 22 which are interconnected by manifold 24 are freely suspended to permit physical movement thereof in response to pressure changes.

A switch 30 is attached proximate the free end in manifold 24 by means of a bracket 32, one end of which is attached to housing 10. Switch 30 is preferably of a type manufactured by Honeywell Company and known by the trademark Microswitch. Such a switch has the desirable operating characteristics that permits a very small physical movement of switch actuator 34 to cause a snap-acting switching mechanism to operate. A plate 40 is fixedly attached to manifold 24 and extends into the proximity of switch actuator 34.

A pressure adjusting knob 36 is attached to a shaft 37 which passes through housing 10. The bottom end of shaft 37 is threaded to be secured to the end of bracket 32 by means of fastener 38 and spring 39. Shaft 37 is threaded over a portion 41 which passes through housing 10, and the hole through housing 10 is threaded with engaging threads, so that rotation of adjusting knob 36 causes shaft 37 to extend and retract a short distance relative to housing 10. This causes a deflection of the end 42 of bracket 32, and a corresponding movement of switch 30. Such movement of switch 30 causes actuator 34 to move relative to plate 40 and thereby changes the pressure deflection of plate 40 required to actuate switch 30.

Figure 3:
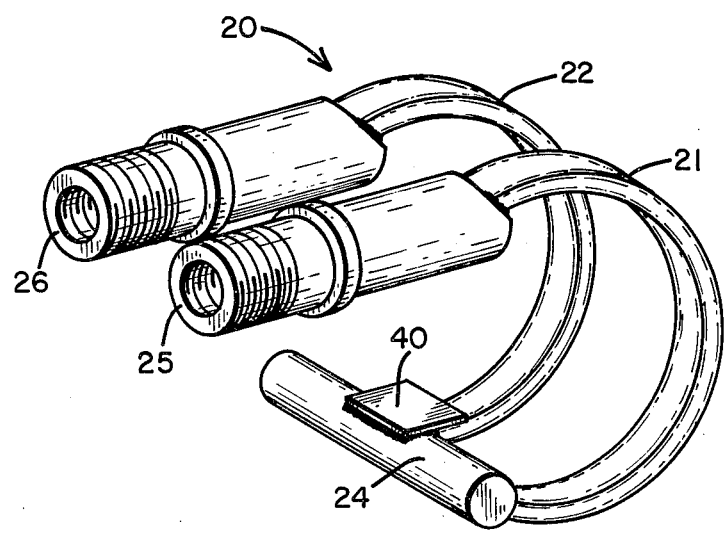
FIG. 3 is an isometric view of the pressure sensor.

FIG. 3 shows pressure sensor 20 in isometric view, wherein it is shown that a closed flow path exists from inlet connection 25, through curved tube 21, manifold 24, curved tube 22, and outlet connection 26. Curved tubes 21 and 22 are respectively attached at their ends to the inlet and outlet connections and to manifold 24 by means of silver solder or other similar connection. All of the flow components shown in FIG. 3 are preferably made from stainless steel, and tubes 21 and 22 are preferably flattened to a height/width ratio of approximately 1:2.

In operation, the invention is preferably mounted to an electric motor-driven pumping system, and the fluid to be pumped is circulated through the pressure sensor by connections to inlet 25 and outlet 26. Switch 30 is wired to the electic circuit controlling the operation of the electric motor. A coarse adjustment of the pressure range over which switch actuator 34 becomes actuated is made by adjusting fastener 38, which sets the nominal position of bracket end 42. A fine adjustment of the operating pressure range may then be made by turning knob 36, such that the electric motor driving the pump may be turned on when the pressure drops to a predetermined level, and may be turned off when the pressure rises to a predetermined level, which pressure levels will be indicated by the relative deflection of plate 40 in response to the pressure of the liquid within tubes 21 and 22. Switches having different turn-on and turn-off actuator positions are well-known in the art, and a suitable switch can readily be found to provide this function. One suitable switch for this application is a "Micro Switch", Catalog No. 10 BS 210, which has a differential travel of from 0.005 inch to 0.010 inch, and requires an operating force of 11–20 ounce.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A fluid pressure sensing and switching apparatus for insertion in series fluid flow relationship in a pressurized fluid flow line, comprising
   (a) a housing having an inlet and outlet for respective connection in series flow relation to said fluid flow line;
   (b) a pair of curved tubes in generally parallel alignment, one end of one of said tubes coupled to said housing inlet and one end of the other of said tubes coupled to said housing outlet, the respective other ends of each of said tubes being freely suspended;
   (c) a flow through manifold coupled between the respective other ends of said tubes;
   (d) a bracket attached to said housing, said bracket having an L-shaped member with a free end proximate said manifold; and
   (e) a switch mounted on said bracket, said switch having an actuator in close proximity to said manifold.

2. The apparatus of claim 1, further comprising a shaft threaded through said housing and having an end connected to the free end of said bracket.

3. The apparatus of claim 2, further comprising an actuator plate attached to said manifold at a position adjacent to said switch actuator.

4. The apparatus of claim 3, further comprising a turnable knob attached to said shaft external of said housing.

5. The apparatus of claim 4, further comprising cover means for enclosing said housing.

6. A fluid pressure sensing apparatus comprising a mounting base; a pair of curved hollow tubes in generally parallel alignment, and attached at respective adjacent first ends to said mounting base and unattached to said mounting base at respective adjacent second ends; means for coupling each of said respective adjacent first tube ends to respective pressurized fluid line connections in series flow arrangement; a flow tube coupled between respective adjacent second tube ends; and a switch attached to said mounting base and having an actuator placed in close proximity to said flow tube.

7. The apparatus of claim 6, further comprising means for positioning said switch actuator relative to said flow tube.

8. The apparatus of claim 7, further comprising a bracket attached between said mounting base and said switch.

9. The apparatus of claim 8, wherein said means for positioning comprises a threaded member operably coupled between said mounting base and said bracket.

* * * * *